United States Patent
Straeter

(10) Patent No.: US 9,655,302 B2
(45) Date of Patent: May 23, 2017

(54) FEEDER ASSEMBLY FOR AN AGRICULTURAL IMPLEMENT

(71) Applicant: James E. Straeter, Rochester, IN (US)

(72) Inventor: James E. Straeter, Rochester, IN (US)

( * ) Notice: Subject to any disclaimer, the term of this patent is extended or adjusted under 35 U.S.C. 154(b) by 275 days.

(21) Appl. No.: 13/852,502

(22) Filed: Mar. 28, 2013

(65) Prior Publication Data
US 2014/0290203 A1    Oct. 2, 2014

(51) Int. Cl.
*A01D 87/04*    (2006.01)
*A01D 89/00*    (2006.01)
*A01F 15/10*    (2006.01)

(52) U.S. Cl.
CPC .............. *A01F 15/10* (2013.01); *A01D 87/04* (2013.01); *A01D 89/003* (2013.01)

(58) Field of Classification Search
CPC ....... A01F 15/10; A01F 15/106; A01D 89/00; A01D 89/001; A01D 89/003; A01D 89/004; A01D 89/006; A01D 89/007; A01D 89/008
USPC ................................... 56/345, 363, 341, 364
See application file for complete search history.

(56) References Cited

U.S. PATENT DOCUMENTS

| | | | | |
|---|---|---|---|---|
| 843,610 A | * | 2/1907 | Johnston | .......................... 56/363 |
| 1,896,626 A | * | 2/1933 | Innes | .............................. 56/364 |
| 2,050,947 A | * | 8/1936 | Harris | ............................ 100/220 |
| 2,347,926 A | * | 5/1944 | Paradise et al. | ................. 56/364 |
| 2,430,734 A | * | 11/1947 | Raney | ..................... A01D 89/00 198/518 |
| 2,452,418 A | * | 10/1948 | Zuckerman | .......... A01D 25/005 171/12 |
| 2,644,291 A | * | 7/1953 | Lemanski | .............. A01D 89/00 198/511 |
| 2,699,031 A | * | 1/1955 | MacDonald | .................... 56/364 |
| 2,783,606 A | * | 3/1957 | Wilson | ........................... 56/364 |
| 2,795,100 A | * | 6/1957 | Sund | ............................... 56/364 |
| 2,896,391 A | * | 7/1959 | Wade | ............................... 56/364 |
| 3,125,845 A | * | 3/1964 | Lee | ................................. 56/364 |
| 3,408,797 A | * | 11/1968 | Currence | ............. A01D 45/065 56/13.5 |
| 3,474,605 A | * | 10/1969 | Resetich | .................... 56/16.4 R |
| 3,514,937 A | * | 6/1970 | Batog | ............................. 56/345 |
| 3,543,497 A | * | 12/1970 | Engeler | ........................... 56/345 |
| 3,566,595 A | * | 3/1971 | Milbrandt et al. | ................ 6/345 |
| 3,678,669 A | * | 7/1972 | Czajkowski | ........... A01D 43/02 56/314 |
| 3,772,860 A | * | 11/1973 | Weiberg | .................. A01D 45/22 56/13.5 |
| 3,785,132 A | * | 1/1974 | Wilson | ........................... 56/364 |
| 3,834,141 A | * | 9/1974 | Bracht | ................ A01F 15/0816 100/73 |
| 3,921,375 A | * | 11/1975 | Cetrulo, Jr. | .......... A01D 45/006 171/31 |
| 3,924,391 A | * | 12/1975 | Cheatum | ................ A01F 15/08 56/341 |

(Continued)

*Primary Examiner* — Robert Pezzuto
*Assistant Examiner* — Joan D Misa
(74) *Attorney, Agent, or Firm* — Zarley Law Firm, P.L.C.

(57) ABSTRACT

A feeder assembly pivotally attached to an implement having a pickup reel wherein the feeder assembly has a continuous belt having a plurality of teeth that is mounted about a pair of rollers. The feeder is angled such that is picks up a windrow of stover from the ground and transports the stover to a raised pickup reel.

10 Claims, 3 Drawing Sheets

(56) References Cited

U.S. PATENT DOCUMENTS

| | | | | |
|---|---|---|---|---|
| 3,975,889 | A * | 8/1976 | Kerber | A01D 57/00 56/14.4 |
| 4,202,159 | A * | 5/1980 | Young | 56/364 |
| 4,234,045 | A * | 11/1980 | Porter | A01D 45/006 171/14 |
| 4,261,163 | A * | 4/1981 | Shaw | 56/327.1 |
| 4,304,089 | A * | 12/1981 | Mescheryakov et al. | 56/364 |
| 4,335,570 | A * | 6/1982 | Fitzmaurice | A01D 45/006 56/13.9 |
| 4,353,201 | A * | 10/1982 | Pierce et al. | 56/364 |
| 4,365,463 | A * | 12/1982 | Bettencourt | A01D 45/006 56/327.1 |
| 4,446,685 | A * | 5/1984 | Coeffic | 56/377 |
| 4,464,890 | A * | 8/1984 | Scholtissek et al. | 56/364 |
| 4,524,576 | A * | 6/1985 | Probst | A01D 84/00 56/364 |
| 4,593,426 | A * | 6/1986 | Chrisley | E01H 1/106 15/3 |
| 4,841,718 | A * | 6/1989 | Sund | 56/364 |
| 4,970,849 | A * | 11/1990 | Friesen | 56/12.4 |
| 5,090,187 | A * | 2/1992 | Mews | 56/364 |
| 5,127,217 | A * | 7/1992 | Fell | A01D 43/02 56/341 |
| 5,136,832 | A * | 8/1992 | Sund | 56/364 |
| 5,822,959 | A * | 10/1998 | Norton | 56/1 |
| 6,212,865 | B1 * | 4/2001 | Peeters et al. | 56/366 |
| 6,688,092 | B2 * | 2/2004 | Anstey | A01D 89/008 56/220 |
| 6,935,094 | B1 * | 8/2005 | McClure | A01D 89/008 56/190 |
| 7,107,748 | B2 * | 9/2006 | McClure | A01D 89/008 56/190 |
| 7,650,741 | B2 * | 1/2010 | Graber | A01D 89/005 56/341 |
| 7,726,111 | B2 * | 6/2010 | Grywacheski et al. | 56/364 |
| 7,866,136 | B1 * | 1/2011 | Hill et al. | 56/364 |
| 8,051,634 | B2 * | 11/2011 | McIlwain | A01D 41/10 56/190 |
| 8,122,694 | B2 * | 2/2012 | Bich et al. | 56/15.8 |
| 8,266,881 | B2 * | 9/2012 | McIlwain | 56/208 |
| 8,371,097 | B1 * | 2/2013 | McClure et al. | 56/341 |
| 8,381,503 | B2 * | 2/2013 | Roberge | A01F 15/106 56/341 |
| 8,402,728 | B2 * | 3/2013 | Kidd | 56/119 |
| 8,443,580 | B2 * | 5/2013 | Matousek | A01F 15/0825 56/341 |
| 8,707,865 | B2 * | 4/2014 | Oakes | A01F 15/106 100/35 |
| 2006/0277889 | A1 * | 12/2006 | Sheedy et al. | 56/364 |
| 2007/0000226 | A1 * | 1/2007 | Grywacheski et al. | 56/364 |
| 2010/0043370 | A1 * | 2/2010 | Viaud | A01F 15/106 56/14.5 |
| 2011/0023442 | A1 * | 2/2011 | Herron | A01F 15/0825 56/341 |
| 2012/0297992 | A1 * | 11/2012 | Oakes | A01F 15/106 100/70 R |
| 2014/0144119 | A1 * | 5/2014 | Olander et al. | 56/341 |
| 2014/0157748 | A1 * | 6/2014 | Olander et al. | 56/341 |
| 2014/0250855 | A1 * | 9/2014 | Vandamme | A01D 89/008 56/379 |

\* cited by examiner

FEEDER ASSEMBLY FOR AN AGRICULTURAL IMPLEMENT

BACKGROUND OF THE INVENTION

The present invention is directed to an auxiliary feeder assembly for a baler or chopper and more particularly to a feeder assembly for picking up stover for delivery to a conventional baler or chopper.

Conventional balers and choppers are well-known in the art. When picking up stover, which is loose and made up of shorter length particles than hay, there are problems that occur. First the tines on a standard pickup device for a baler pushes the stover ahead which is not as effective or as efficient as desired. In addition, when pushing the stover forward the standard pickup device also picks up dirt in the rolling stover as corn fields are cultivated and therefore not as flat as hay fields. In the process of contacting the ground, the tines of the standard pickup device can become damaged. Thus, a device that addresses these deficiencies is desired.

Therefore, an object of the present invention is to provide a feeder assembly that increases the capacity of a baler or chopper.

Another objective of the present invention is to provide a feeder assembly that reduces dirt ingestion.

A still further objective is to provide a feeder assembly that reduces damage to a standard pickup device.

Yet another objective of the present invention is to provide a feeder that can be easily removed to return a baler or chopper to function solely with its original feeder.

These and other objectives will be apparent to one of ordinary skill in the art based upon the following written description, drawings and claims.

SUMMARY OF THE INVENTION

A feeder assembly pivotally attached to an implement forward of a pickup reel. The feeder has a continuous belt having a plurality of teeth that is mounted about a pair of rollers driven by a motor. The feeder is pivotally attached to the implement by a plurality of links that permit the feeder to pivot due to ground irregularities. Skid shoes are attached to the feeder to support the feeder and permit the pick up of stover while reducing the pick up of dirt.

DETAILED DESCRIPTION OF THE PREFERRED EMBODIMENT

Figure 1:
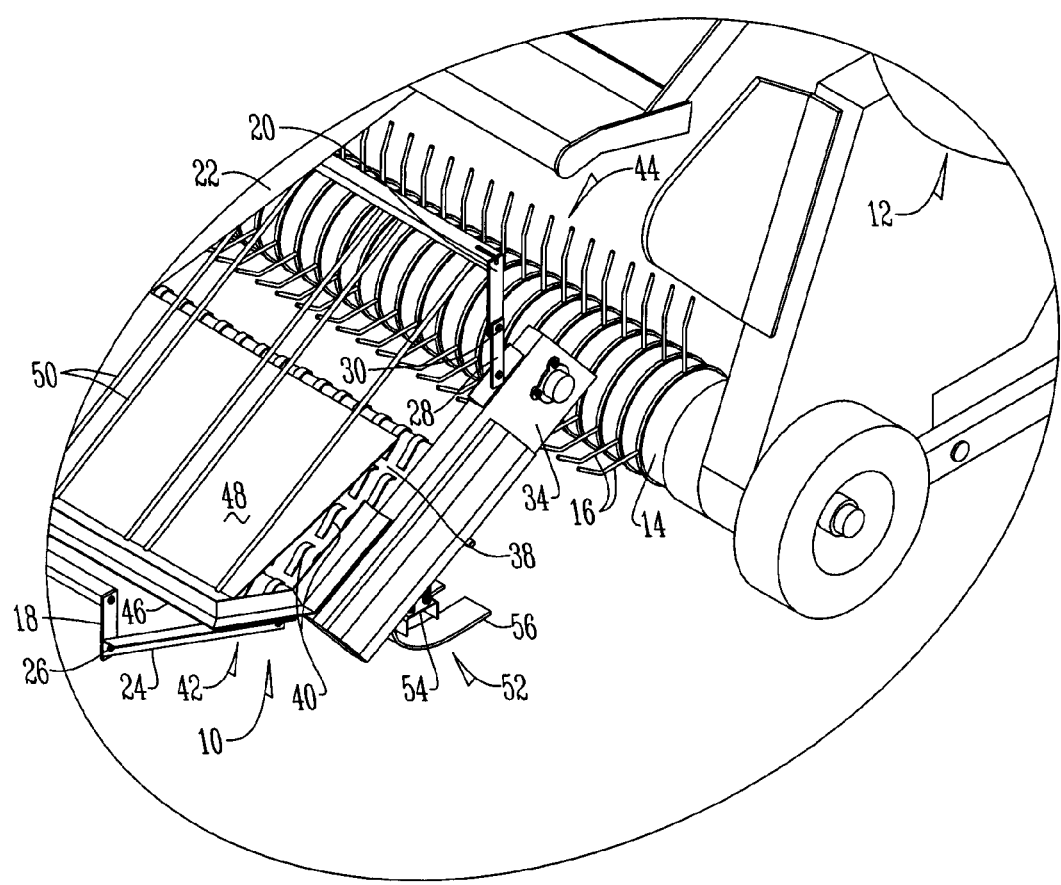
FIG. 1 is a perspective view of a feeder assembly.
Figure 2:
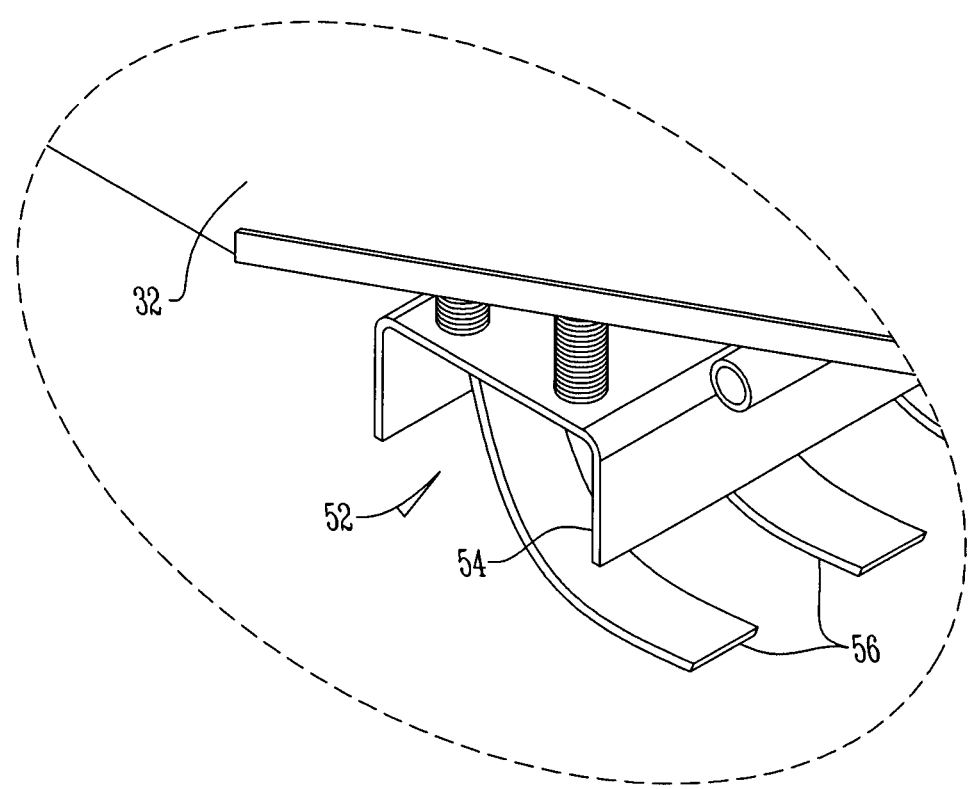
FIG. 2 is a perspective view of a skid shoe.
Figure 3:
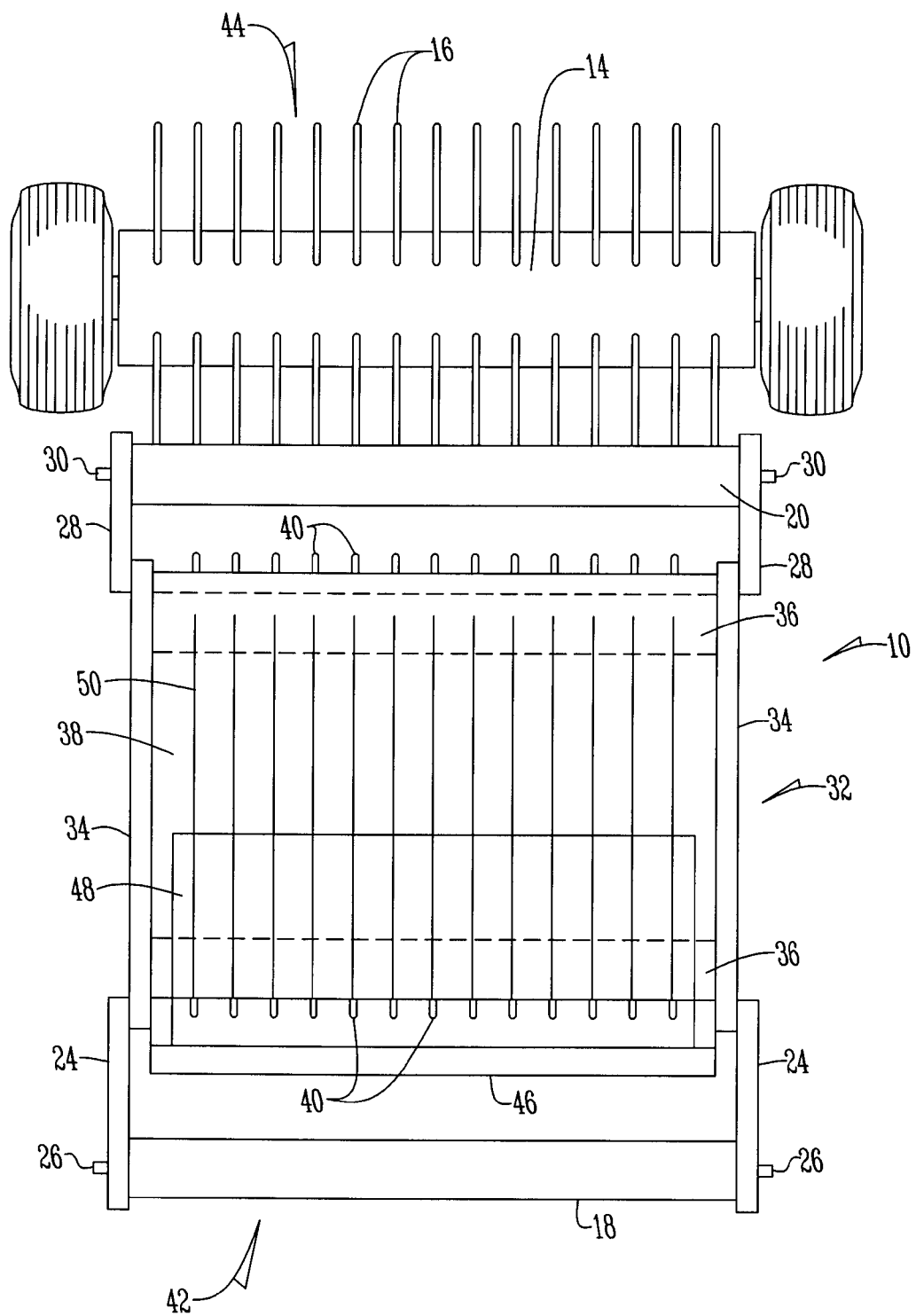
FIG. 3 is a top plan view of a feeder assembly.

Referring to the Figures, a feeder assembly 10 is mounted to an agricultural implement 12 such as a baler, a chopper or the like forward of a pickup reel having a plurality of tines 16. The assembly 10 has a frame having a first bracket 18 and a second bracket 20 connected to a tongue 22 of the implement 12. Preferably the brackets 18 and 20 are U-shaped and extend downwardly from the tongue toward the ground. A first pair of links 24 are pivotally connected at one end to the first bracket 18 by removable pins 26. A second pair of links 28 are pivotally connected to the second bracket 20 by removable pins 30. The opposite ends of links 24 and 28 are similarly connected to a feeder housing 32.

The feeder housing 32 includes a pair of sidewalls 34 in spaced parallel relation, a pair of rollers 36 that are rotatably connected to and extend between the sidewalls 34 and a continuous belt 38 that is mounted about the rollers 36. While a belt is described, any type of conveying device may be used such as a chain or the like. The belt 38 has a plurality of teeth or runners 40 that extend transversely across the belt 38 between the sidewalls 34. The housing 32 has a width sufficient to receive a windrow of stover or the like. Also, the housing 32 is angled in relation to the ground such that an input end 42 is near the ground and a discharge end 44 is raised in relation to the ground and positioned near and/or above the pickup reel 14.

A guide 46 is attached to the top and input end 42 of the housing 32 for directing the stover into the input end 42 of the feeder 10. Attached to the guide 46 and extending over the belt 38 is a shield 48 and a plurality of rods 50. The shield 48 and rods 50 assist in holding the stover on the belt 38.

Connected to the bottom of the housing is a skid shoe mount 52. The skid shoe mount 52 includes a support member 54 that extends between sidewalls 34 and a plurality of skid shoes 56 that are connected to support bar 54. The skid shoe 52 provides support for the feeder as it traverses the ground and assists in preventing the teeth 40 from engaging the ground while maintaining the feeder 10 in the optimal position to engage the crop.

In operation, the feeder 10 is attached to the baler 12 without the use of tools by removable pins 26 and 30. The feeder 10 is positioned at an angle such that the input end 42 is near the ground and the discharge end 44 is raised in relation to the ground and above and/or adjacent the pickup reel 14 of the baler 12. Once activated, the belt 38 is propelled by rollers 36 that are driven by a motor (not shown) such that the teeth 40 on the upper surface of the feeder 10 move toward the pickup reel 14. As the baler 12 moves forward the teeth 40 of the feeder 10 engage a windrow of stover at the input end 42 pulling the stover onto the belt 38. The stover is transported from the input end 42 to the discharge end 44 on belt 38. As the baler 12 moves across a field, the links 24 and 28 permit the feeder 10 to pivot based upon ground irregularities. Once stover reaches the discharge end 44 the stover is transferred to and received by the pickup reel 14 where further processing occurs as desired.

Thus, a feeder assembly has been shown that improves efficiency and capacity by pulling stover onto the feeder instead of pushing stover forward. Further, through use of the skid shoes and links less dirt is picked up and ingested into the pickup reel and damage to the tines of the pickup reel is reduced. Also, the feeder assembly is easily removed to permit the baler to be used for other applications such as baling hay. Finally, the feeder assembly allows the standard pick up reel to operate above crop stubble and clear of dirt.

What is claimed is:

1. A feeder assembly for an agricultural implement, comprising:
    an agricultural implement having a pickup reel;
    a feeder housing pivotally connected to a first bracket by a first pair of links and a second bracket by a second pair of links and having a continuous belt with a plurality of teeth mounted about a pair of rollers;
    the feeder housing pivotally connected to the implement forward of the pickup reel wherein the feeder assembly is positioned at an angle such that an input end is near a ground area and a discharge end is raised in relation to the ground and adjacent the pickup reel.

2. The assembly of claim 1 wherein skid shoes are connected to the feeder housing.

3. The assembly of claim 2 wherein the skid shoes contact the ground to prevent the teeth from contacting the ground and maintaining an optimal position to engage a crop.

4. The assembly of claim 2 wherein the skid shoes are connected to a support bar that extends between sidewalls of the feeder housing.

5. The assembly of claim 1 wherein the feeder housing is removably connected without the use of tools.

6. The assembly of claim 1 wherein the first bracket and the second bracket are u-shaped.

7. The assembly of claim 1 wherein a guide is attached to a top of the feeder housing at an input end.

8. The assembly of claim 7 further comprising a shield and a plurality of rods are attached to the guide.

9. A feeder assembly for an agricultural implement, comprising:
   an agricultural implement having a pickup reel;
   a feeder housing having a continuous belt with a plurality of teeth mounted about a pair of rollers;
   a first pair of links pivotally connected between a first bracket and one end of the feeder housing;
   a second pair of links pivotally connected between a second bracket and the other end of the feeder housing;
   the second bracket connected to the implement;
   wherein when the feeder assembly moves across a field, the first pair of links and the second pair of links permit the feeder assembly to pivot based upon ground irregularities.

10. A feeder assembly for an agricultural implement, comprising:
   an agricultural implement having a pickup reel;
   a feeder housing pivotally connected to a first bracket by a first pair of links having a continuous belt with a plurality of teeth mounted about a pair of rollers;
   the feeder housing pivotally connected to the implement forward of the pickup reel wherein the feeder assembly is positioned at an angle such that an input end is near a ground area and a discharge end is raised in relation to the ground and adjacent the pickup reel; and
   wherein when the implement moves forward, the plurality of teeth engage a windrow at the input end and pull the windrow onto the continuous belt.

* * * * *